Patented Feb. 13, 1923.

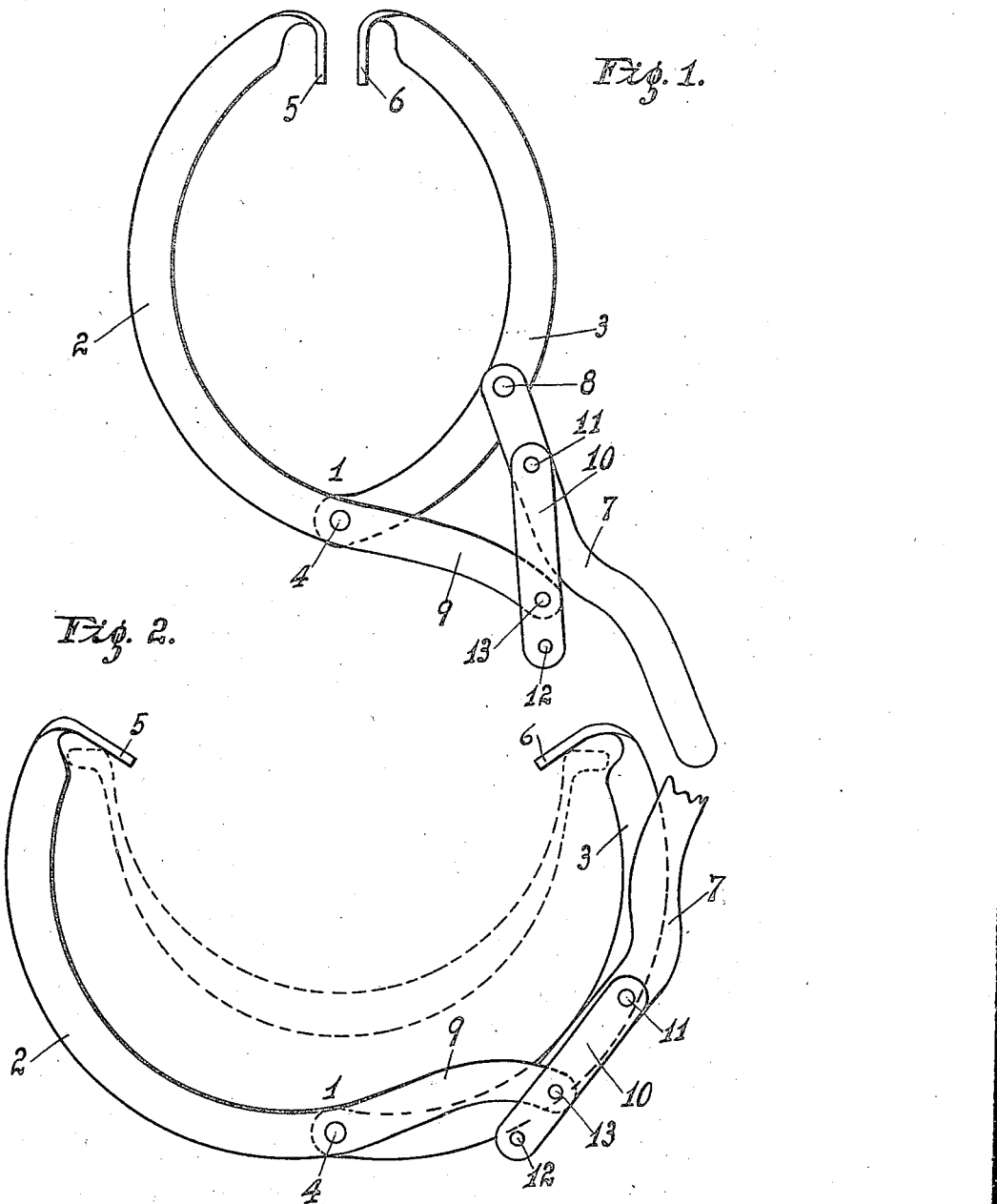

1,445,343

UNITED STATES PATENT OFFICE.

ROBERT J. MILLER, OF OAKLAND, CALIFORNIA, ASSIGNOR OF ONE-HALF TO JAMES J. BRETT, OF OAKLAND, CALIFORNIA.

TIRE SPREADER.

Application filed February 15, 1921. Serial No. 445,235.

*To all whom it may concern:*

Be it known that I, ROBERT J. MILLER, a citizen of the United States, residing at Oakland, in the county of Alameda and State of California, have invented certain new and useful Improvements in Tire Spreaders, of which the following is a specification.

My invention is a tire spreader particularly useful for spreading tires so that they may be readily repaired.

Referring to the annexed drawing in which my invention is illustrated and which forms a part of this specification:

Figure 1 is a side view of my tire spreader in closed position.

Figure 2 is a side view of my tire spreader in open position engaging a tire and spreading it.

My invention includes a pair of tongs 1 which comprises a pair of tong members 2 and 3 pivoted together by a pivot 4. On the engaging ends of said tong members are hooks 5 and 6 respectively for engaging the beads of the outer casing of a pneumatic tire as shown in Figure 1. A lever 7 is pivoted at 8 to the tong member 3. The tong member 2 has an arm 9 extending from the pivot 4. A link 10 is pivoted at one end by pivot 11 to the lever 7 and has a plurality of holes 12 to receive a pin 13 to pivotally connect it to the end of the arm 9 at different points. The tong member is of such shape as to fit around the outside of the tire so that their hooks 5 and 6 will engage the inside of the tire beads. By swinging the lever 7 up the tong members are spread through the medium of link 10 and arm 9, which members by means of their hooks 5 and 6 spread the tire.

By placing the pin 13 in different holes 12 the spreading distance of the tong members may be varied.

Having described my invention, I claim:

1. A tire spreader formed of two tong members pivoted to each other, hooks on the ends of the tong members for engaging the tire beads, a lever pivoted to one tong member, an arm on the other tong member, and a link connecting said lever and said arm.

2. A tire tool comprising a pair of arms adapted to be positioned at the outer side of a shoe and pivotally connected adjacent the tread of the shoe, devices at the free ends of said arms for engaging the opposite edges of the shoe, and means adjacent said pivotal connection for opening said arms and locking them in open position.

In testimony whereof I affix my signature.

ROBERT J. MILLER.